(12) United States Patent
Fukunaga et al.

(10) Patent No.: US 6,575,276 B2
(45) Date of Patent: Jun. 10, 2003

(54) TORQUE CONVERTER

(75) Inventors: Takao Fukunaga, Yawata (JP); Kozo Mori, Osaka (JP)

(73) Assignee: Exedy Corporation, Neyagawa (JP)

( * ) Notice: Subject to any disclaimer, the term of this patent is extended or adjusted under 35 U.S.C. 154(b) by 0 days.

(21) Appl. No.: 09/985,098

(22) Filed: Nov. 1, 2001

(65) Prior Publication Data

US 2002/0056600 A1 May 16, 2002

(30) Foreign Application Priority Data

Nov. 15, 2000 (JP) ........................................ 2000-347889

(51) Int. Cl.$^7$ ............................................... F16D 33/00
(52) U.S. Cl. ...................................... 192/3.29; 192/212
(58) Field of Search ........................... 192/3.28, 3.29, 192/212

(56) References Cited

U.S. PATENT DOCUMENTS

| | | | | |
|---|---|---|---|---|
| 4,930,608 A | * | 6/1990 | Schenk et al. | 192/3.29 |
| 5,186,292 A | * | 2/1993 | Hageman et al. | 192/3.28 |
| 5,487,003 A | * | 1/1996 | Iwasawa et al. | 701/51 |
| 5,782,327 A | * | 7/1998 | Otto et al. | 192/3.29 |
| 6,000,510 A | * | 12/1999 | Kirkwood et al. | 192/3.29 |
| 6,264,018 B1 | * | 7/2001 | Matsuoka et al. | 192/3.29 |
| 6,464,054 B2 | * | 10/2002 | Fukunaga et al. | 192/3.29 |

FOREIGN PATENT DOCUMENTS

JP 2000283188 A 10/2000

* cited by examiner

*Primary Examiner*—Saul Rodriguez
(74) *Attorney, Agent, or Firm*—Shinjyu Global IP Counselors, LLP

(57) ABSTRACT

In a torque converter provided with a lockup device, performance of a torsion spring is improved, preferably by increasing its size, while suppressing an increase of an axial dimension of the torque converter. The torque converter includes a toric fluid actuating portion having an impeller, a turbine, and a stator. A ratio (D2/D1) of an inside diameter D2 to an outside diameter D1 of the fluid actuating portion is equal to or greater than 0.61.

23 Claims, 2 Drawing Sheets

TORQUE CONVERTER

BACKGROUND OF THE INVENTION

1. Field of the Invention

This invention generally relates to a torque converter. More specifically, the present invention relates to a torque converter having a lockup device.

2. Background Information

In general, a torque converter can smoothly accelerate and decelerate because power is transmitted by fluid. However, a loss of energy can be caused by fluid slip resulting in poor fuel economy. Therefore, a torque converter that is mounted with a lockup device for mechanically connecting an input-side front cover and an output-side turbine exists among prior art torque converters. The lockup device is disposed in a space between the front cover and the turbine. The lockup device is mainly formed of a disc-shaped piston, a driven plate, and a torsion spring. The disc-shaped piston can be pressed against the front cover. The driven plate is mounted to a back face side of the turbine. The torsion spring elastically connects the piston and the driven plate in a rotating direction. An annular frictional member is arranged on the piston and faces a flat frictional face of the front cover.

In a conventional prior-art lockup device, actuation of the piston is controlled by change in hydraulic pressure in a fluid chamber. Hydraulic fluid is preferably supplied between the piston and the front cover from an outside hydraulic circuit when the lockup device is disconnected. This hydraulic fluid flows radially outward through a space between the front cover and the piston and flows into a torque converter main body on an outer periphery portion side. In a lockup connection, the hydraulic fluid in a space between the front cover and the piston is drained from an inner periphery side. As a result, the piston moves toward a front cover due to a hydraulic pressure difference. The frictional member provided on the piston is pushed against the frictional face of the front cover. Thus, torque from the front cover is transmitted to a turbine side through the lockup device.

On the other hand, improved performance of a damper mechanism is desired between low speeds of a vehicle and increases in torque. In recent years, there is a known torque converter in which torque is transmitted by fluid only when a vehicle starts, and the lockup device is connected at a speeds of 20 km per hour or greater, for example. In such a structure in which a lockup region is expanded, improved performance of the torsion spring is desired to absorb and damp torsional vibrations sufficiently in response to torque changes from an engine. Improving vibration absorbing/damping characteristics for torsional vibration by increasing a diameter of the torsion spring is desired. However, since the torsion spring is disposed axially between the front cover and the turbine, the size of the entire torque converter increases if the torsion spring size is increased.

In view of the above, there exists a need for torque converter that overcomes the above-mentioned problems in the prior art. This invention addresses this need in the prior art as well as other needs, which will become apparent to those skilled in the art from this disclosure.

SUMMARY OF THE INVENTION

It is an object of the present invention to improve performance of a torsion spring, preferably through increasing its size, while suppressing an increase of an axial dimension of a torque converter in the torque converter provided with a lockup device.

A torque converter according to a first aspect of the present invention has a toric fluid actuating portion that includes an impeller, a turbine, and a stator. A ratio (D2/D1) of an inside diameter D2 to an outside diameter D1 of the fluid actuating portion is equal to or greater than 0.61. In this torque converter, since the inside diameter of the fluid actuating portion is larger than that of the prior art, it is possible to dispose the torsion spring of the lockup device on an inner periphery side of the fluid actuating portion. Therefore, it is possible to increase sufficiently the size of the torsion spring to improve performance of the torsion spring without increasing the axial dimensions of the torque converter.

In a torque converter according to a second aspect of the present invention, the torque converter of the first aspect has a ratio in which the D2/D1 is in a range of 0.61 to 0.77. If D2/D1 becomes equal to or greater than 0.77, a flow path area in the torus becomes very small and therefore a flow rate acting on blades decreases. Thus, a torque capacity of the impeller becomes small. Moreover, a radius of an outlet of the turbine becomes large and the maximum efficiency of the torque converter is reduced.

A torque converter according to a third aspect of the present invention has a front cover, a fluid actuating portion, and a lockup device. The fluid actuating portion includes an impeller, a turbine, and a stator connected to the front cover. The lockup device is disposed between the front cover and the turbine to connect mechanically both the front cover and turbine. The lockup device has a torsion spring for absorbing and damping torsional vibration. An outer peripheral edge of the torsion spring is positioned on an inner periphery side of an inner peripheral edge of the fluid actuating portion.

In this torque converter, the torsion spring of the lockup device is not arranged side by side with the fluid actuating portion in an axial direction but positioned on a radially inner side of the fluid actuating portion. Therefore, it is possible to increase sufficiently the size of the torsion spring to improve performance of the torsion spring without increasing the axial dimension of the torque converter.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS (1) Structure

Figure 1:
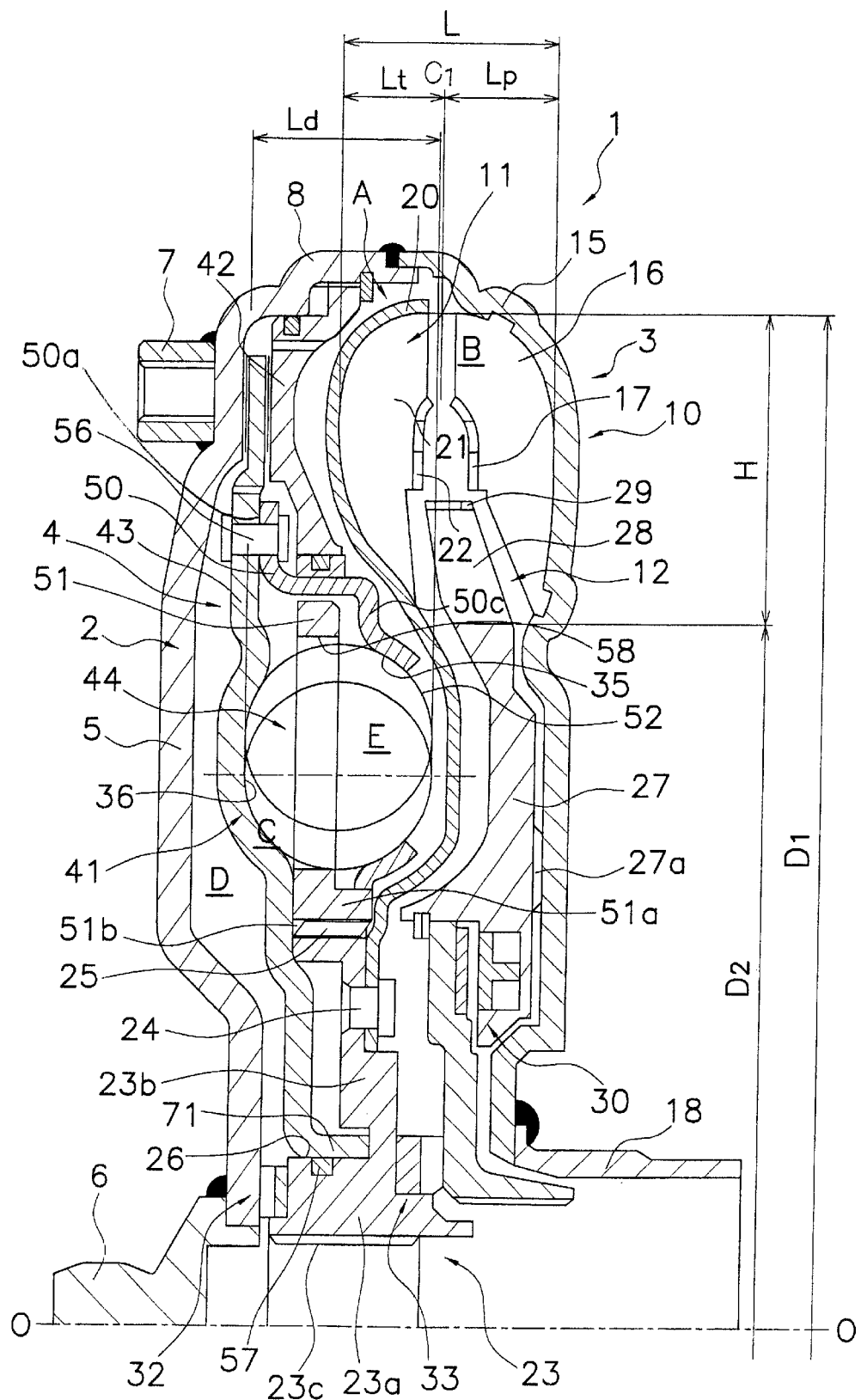
FIG. 1 is a elevational sectional schematic view of a torque converter in accordance with a preferred embodiment of the present invention.
Figure 2:
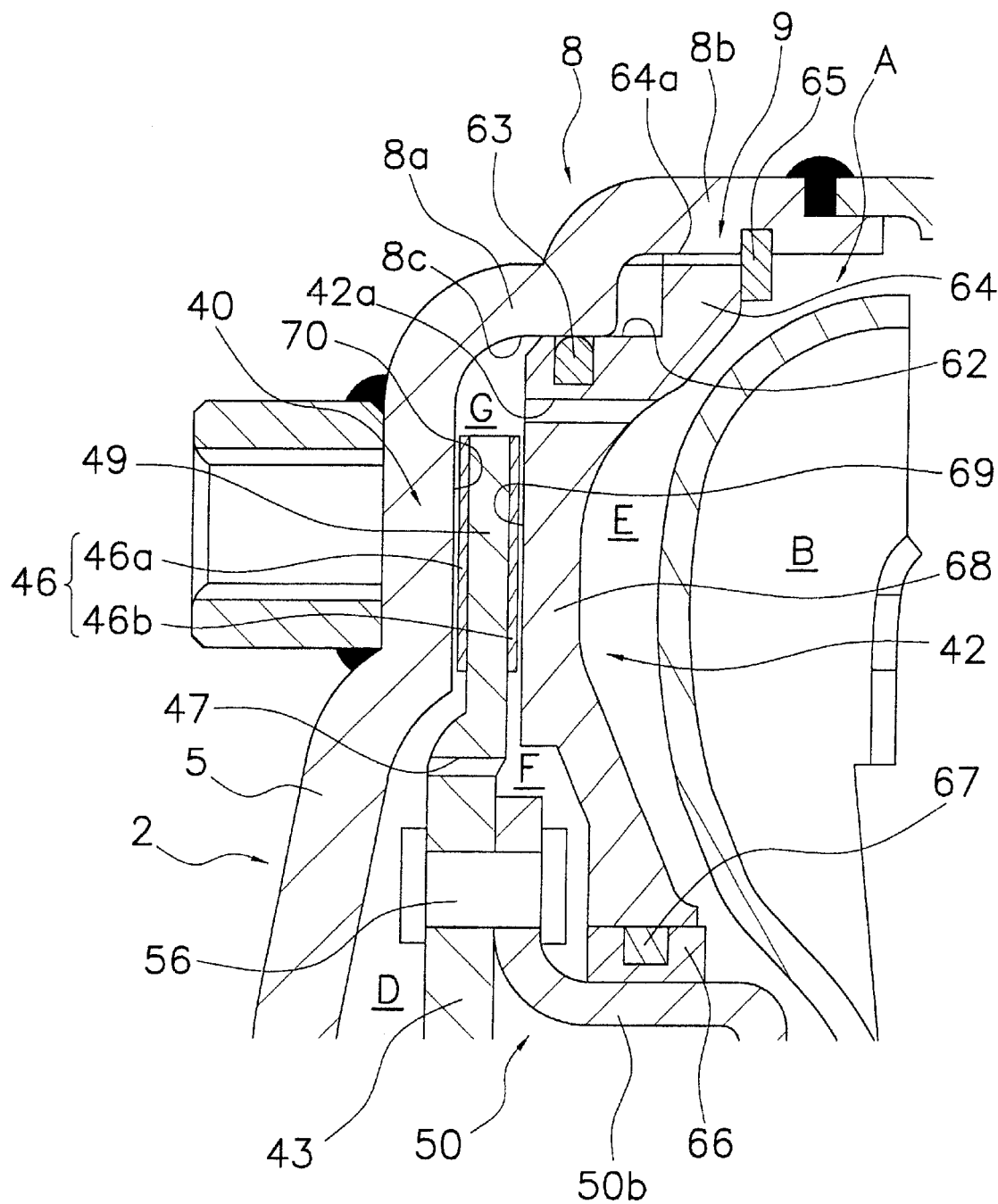
FIG. 2 is a partial enlarged view of FIG. 1 illustrating a clutch-connecting portion of a lockup device.

In FIGS. 1 and 2 the left side represents an engine side while the right side represents a transmission side. FIG. 1 shows a torque converter 1 in accordance with a preferred embodiment of the present invention. As seen in FIG. 1, the torque converter 1 is mainly formed of a front cover 2, a toric fluid actuating portion 3, and a lockup device 4. The toric fluid actuating portion 3 is formed of three kinds of impellers (an impeller 10, a turbine 11, and a stator 12). The impellers are disposed concentrically with the front cover 2. The lockup device 4 is disposed in a space between the front cover 2 and the turbine 11 in an axial direction. The front cover 2 and an impeller shell 15 of the impeller 10 are fixed to each other by welding at outer peripheral portions thereof and form a fluid chamber A filled with hydraulic fluid.

The front cover 2 is a member to which torque from a crankshaft (not shown) of an engine is input. The front cover 2 is mainly formed of a disc-shaped main body 5. A center boss 6 is fixed to a center of the main body 5. At least one nut 7 is fixed to a side face of an outer peripheral portion of the main body 5 on the engine side. An outer peripheral tubular portion 8 extending toward a transmission (not shown) is formed integrally with the outer peripheral portion of the main body 5 as best seen in FIG. 2.

The outer peripheral tubular portion 8 is formed of an axial engine-side portion 8a and an axial transmission-side portion 8b. The axial transmission-side portion 8b is positioned on an outer periphery side with respect to the axial engine-side portion 8a. An inner peripheral face 8c of the axial engine-side portion 8a has a section extending straight in an axial direction. A spline 9 is formed on an inner peripheral face of the axial transmission-side portion 8b.

An annular and flat frictional face 70 is formed inside and at the outer peripheral portion of the main body 5 of the front cover 2. The frictional face 70 axially faces the transmission.

Referring to FIG. 1, the fluid actuating portion 3 is disposed on the transmission side in the axial direction in the fluid chamber A. Thus, an inside part of the fluid chamber A is partitioned into a fluid actuating chamber B and a space C. The fluid actuating chamber B is a space in the fluid actuating portion 3. The space C is formed between the main body 5 of the front cover 2 and the turbine 11.

The impeller 10 is formed of the impeller shell 15, at least one impeller blade 16, an impeller core 17, and an impeller hub 18. Each impeller blade 16 is fixed inside the impeller shell 15. The impeller core 17 is fixed inside each impeller blade 16. The impeller hub 18 is fixed to an inner peripheral edge of the impeller shell 15. Each impeller blade 16 has a much smaller radial dimension than a conventional prior-art impeller blade and is fixed to an outer periphery-side portion of the impeller shell 15.

The turbine 11 is disposed to face the impeller 10 in the fluid chamber A. The turbine 11 is formed of a turbine shell 20, at least one turbine blade 21, a turbine core 22, and a turbine hub 23. Each turbine blade 21 is fixed to the turbine shell 20. The turbine core 22 is fixed inside each turbine blade 21. The turbine hub 23 is fixed to an inner peripheral edge of the turbine shell 20. Each turbine blade 21 has a much smaller radial dimension than a conventional prior-art turbine blade and is fixed to an outer periphery-side portion of the turbine shell 20.

The turbine hub 23 has a cylindrical boss 23a and a flange 23b extending from the boss 23a toward an outer periphery side. The flange 23b is fixed to an inner peripheral portion of the turbine shell 20 by at least one rivet 24. A spline 23c is formed on an inner peripheral face of the boss 23a. A shaft (not shown) extending from the transmission side is engaged with the spline 23c. As a result, torque from the turbine hub 23 is output to the shaft (not shown). A spline 25 is formed on an outer peripheral face of the flange 23b of the turbine hub 23. An outer peripheral face 26 of the boss 23a on the axial engine side extends straight in the axial direction.

The stator 12 is disposed between an inner peripheral portion of the impeller 10 and an inner peripheral portion of the turbine 11. The stator 12 "straightens" hydraulic fluid returning from the turbine 11 to the impeller 10 to amplify torque in the torque converter 1. This torque amplifying operation can obtain superior accelerating performance when a vehicle starts. The stator 12 is formed of a stator carrier 27, at least one stator blade 28, and a stator core 29. Each stator blade 28 is provided on an outer peripheral face of the stator carrier 27. The stator core 29 is provided on an outer periphery side of each stator blade 28.

An inner periphery-side portion of an inlet-side face of the stator blade 28 is positioned closer to the transmission in the axial direction than an outer periphery-side face. In other words, the inlet-side face of the stator blade 28 has a tapered shape. The outer periphery-side portion of the inlet-side face of the stator blade 28 is axially closer to the engine than an axial central position C1 of the fluid-actuating potion 3. Further, the inner periphery-side portion of the inlet-side face of the stator blade 28 is axially closer to the transmission than the axial central position C1 of the fluid actuating portion 3. By the aforementioned configuration, it is possible to obtain a space on an inner periphery side of the fluid-actuating portion 3 and to use a damper mechanism 44, which will be described later, of greater size when compared to that of the prior art. An outlet-side face of the stator blade 28 also has in a tapered shape similar to that of the inlet-side face. As a result, the stator blade 28 has a substantially constant axial width. The stator blade 28 has much smaller radial and axial dimensions than a conventional prior-art stator blade.

The stator carrier 27 is supported by a fixed shaft (not shown) through a one-way clutch 30. The stator carrier 27 extends by a longer distance in a radial direction than a conventional prior-art stator carrier and is shaped such that a face of the stator carrier 27 on the axial engine side is substantially indented the length of the face. A radial intermediate portion of the face of the stator carrier 27 on the axial engine side is preferably closer to the transmission in the axial direction than the outer periphery-side portion and the inner periphery-side portion of the inlet-side face of the stator blade 28. The radial intermediate portion of the face of the stator carrier 27 is closer to the transmission in the axial direction than the axial central position C1 of the fluid actuating position 3.

An inner periphery-side portion (a portion to which each turbine blade 21 is not fixed) of the turbine shell 20 is preferably curved in the axial direction toward the stator carrier 27. Further, a radial intermediate portion of the turbine shell 20 is closer to the transmission in the axial direction than the axial central position C1 of the fluid actuating portion 3. By forming a recessed portion facing the axial engine side by curving the stator carrier 27 and the turbine shell 20 toward the axial transmission side by large amounts as described above, the preferred space for the damper mechanism 44, which will be described later, can be obtained on the inner periphery side of the fluid actuating portion 3, and especially on the inner periphery side of a portion corresponding to the turbine 11.

A first washer 32 is disposed between the main body 5 of the front cover 2 and the turbine hub 23 in the axial direction. At least one groove extending in a radial direction is formed on an end face of the first washer 32 on the axial engine side. Through each groove, hydraulic fluid can flow between radial opposite sides of the first washer 32. A second washer 33 is disposed between the turbine hub 23 and the one-way clutch 30. At least one groove extending in a radial direction is formed on an end face of the second washer 33 on the axial transmission side. Through each groove, hydraulic fluid can flow between radial opposite sides of the second washer 33.

At least one contact portion 27a in contact with an inner peripheral portion of the impeller shell 15 is formed on the axial engine side of the stator carrier 27. Each contact portion 27a is formed and arranged in a rotating direction. A gap extending in a radial direction is formed between each adjacent contact portion 27a. By each gap, hydraulic fluid can flow between radial opposite sides of each contact portion 27a.

In the present embodiment, a first oil path of a hydraulic circuit is connected between the impeller hub 18 and the stator 12 in the axial direction. A second oil path of the hydraulic circuit is connected between the stator 12 and the turbine hub 23 in the axial direction. A third oil path of the hydraulic circuit is connected between the turbine hub 23 and the inner peripheral portion of the front cover 2. The first oil path and the second oil path are normally connected to the common hydraulic circuit and supply hydraulic fluid to the fluid actuating portion 3 or discharge hydraulic fluid from the fluid actuating portion 3. The third oil path is formed in the shaft (not shown) and can supply hydraulic fluid between the front cover 2 and the turbine hub 23, i.e., an inner peripheral portion of the space C or discharge hydraulic fluid from the space C.

Next, the space C will be described. The space C is an annular space formed between the main body 5 of the front cover 2 and the turbine 11 in the axial direction. An axial engine side of the space C is formed by the main body 5 of the front cover 2. An axial transmission side of the space C is formed by the turbine shell 20 of the turbine 11. An outer periphery side of the space C is mainly formed by an inner peripheral face of the outer peripheral tubular portion 8. An inner peripheral side of the space C is formed by an outer peripheral face of the turbine hub 23. The space C is connected to the outside hydraulic circuit on the inner periphery side, i.e., between the inner peripheral portion of the front cover 2 and the turbine hub 23. The space C communicates with the fluid actuating chamber B at the outer peripheral portion of the space C through a gap between an outlet of the impeller 10 and an inlet of the turbine 11. The lockup device 4 is disposed in the space C to connect mechanically the front cover 2 and the turbine 11 and to cancel the connection by change in hydraulic pressure in the space C. The lockup device 4 is mainly formed of a piston mechanism 41 and a second piston 42.

The piston mechanism 41 has a piston function to be actuated voluntarily by the change in the hydraulic pressure in the space C and a damper function of absorbing and damping torsional vibration in the rotating direction. The piston mechanism 41 is formed of a first piston 43 and the damper mechanism 44. The first piston 43 is a disc-shaped member disposed close to the main body 5 of the front cover 2 in the space C. The first piston 43 divides the space C into a first space D on a side of the front cover 2 and a second space E on a side of the turbine 11. As seen in FIG. 2, an outer peripheral portion of the first piston 43 is formed as a frictional connecting portion 49 disposed on the axial transmission side of the frictional face 70 of the front cover 2. The frictional connecting portion 49 is an annular flat plate-shaped portion. Annular frictional members 46 are arranged on axial opposite sides of the frictional connecting portion 49. In the following description, the frictional member 46 facing the frictional face 70 is referred to as a first frictional member 46a and the frictional member 46 on an opposite side is referred to as a second frictional member 46b. Oil grooves passing through the first frictional member 46a and the second frictional member 46b in a radial direction are formed on surfaces of the first and second frictional members 46a and 46b.

As seen in FIG. 1, an inner peripheral tubular portion 71 is formed at an inner peripheral edge of the first piston 43. The inner peripheral tubular portion 71 extends from the inner peripheral edge of the first piston 43 toward the axial transmission side. An inner peripheral face of the inner peripheral tubular portion 71 is supported for movement in axial and rotating directions by the outer peripheral face 26 of the turbine hub 23. An axial transmission side of the inner peripheral tubular portion 71 can come in contact with the flange 23b of the turbine hub 23. Thus, movement of the first piston 43 toward the axial transmission side is restricted. An annular groove is formed on the outer peripheral face 26 and a seal ring 57 is disposed in the groove. The seal ring 57 is in contact with the inner peripheral face of the inner peripheral tubular portion 71. By this seal ring 57, the first space D and the second space E are separated from each other.

As described above, an inner peripheral portion of the first space D communicates with the third oil path and is separated from the second space E by the seal ring 57. An outer peripheral portion of the first space D is separated from the second space E in a state in which the frictional connecting portion 49 is in contact with the frictional face 70 and communicates with the second space E in a state in which the frictional connecting portion 49 is separated from the frictional face 70.

The damper mechanism 44 transmits torque from the first piston 43 to the turbine 11 side, and absorbs and damps torsional vibrations. The damper mechanism 44 is disposed between an inner peripheral portion of the first piston 43 and the inner peripheral portion of the turbine shell 20 in the second space E. The damper mechanism 44 is mainly formed of a drive member 50, a driven member 51, and a torsion spring 52. The drive member 50 is an annular disc-shaped member disposed at a distance toward the engine in the axial direction from the first piston 43. An outer peripheral portion of the drive member 50 is fixed to the first piston 43 by at least one rivet 56. At least one rectangular window 35 for supporting the torsion spring 52 is formed in the drive member 50. Each rectangular window 35 passes through the drive member 50 in the axial direction and cut-and-raised portions axially projecting toward the transmission are formed on radial opposite edges of the rectangular window 35. A support portion 36 is formed in a position of the first piston 43 that corresponds to each rectangular window 35. The support portion 36 is a projecting portion formed in an axial direction by drawing such that an axial transmission side of the support portion 36 has a recessed shape. A portion of the support portion 36, in contact with the torsion spring 52, is subjected to predetermined heat treatment. As described above, the first piston 43 functions as a damper casing of the damper mechanism 44 and one of the prior-art drive plates can be omitted. As a result, the number of parts is reduced and the entire structure is simplified.

The drive member 50 includes an outer peripheral portion 50a, a tubular portion 50b, and an annular portion 50c. The outer peripheral portion 50a is fixed to the first piston 43 by each rivet 56. The tubular portion 50b axially extends from the outer peripheral portion 50a toward the transmission. The annular portion 50c extends radially inward from the tubular portion 50b. Each above-described rectangular window 35 is formed in the annular portion 50c.

The driven member 51 is an annular plate and disposed between the first piston 43 and the drive member 50 in the axial direction. At least one window hole 58 axially passing through the driven member 51 is formed in a position of the driven member 51. Each window hole 58 corresponds to each rectangular window 35 of the drive member 50. A tubular portion 51a axially extending toward the transmission is formed at an inner peripheral edge of the driven member 51. A spline 51b engaged with the spline 25 of the turbine hub 23 is formed on an inner peripheral face of the tubular portion 51a. By this spline engagement, the driven member 51 cannot rotate with respect to the turbine hub 23 but can move axially. An outer peripheral face of the tubular portion 51a is in contact with an inner peripheral face of the drive member 50. Thus, the driven member 51 is positioned in a radial direction with respect to the drive member 50.

The torsion spring 52 is disposed in the window hole 58. The torsion spring 52 is preferably a coil spring extending in a rotating direction. End portions in the rotating direction of the torsion spring 52 are supported by the above-described window hole 58, rectangular window 35, and support portion 36. Furthermore, axial movement of the torsion spring 52 is restricted by each rectangular window 35 of the drive member 50 and the support portion 36. The torsion spring 52 is disposed to correspond to the inner peripheral portion of the turbine shell 20. A portion of the torsion spring 52 is positioned in a recessed groove of the inner peripheral portion.

The second piston 42 is disposed on the axial transmission side of the outer peripheral portion of the first piston 43 and on an outer periphery side of the damper mechanism 44 in the second space E. Referring to FIG. 2, the second piston 42 is an annular plate and includes a frictional connecting potion 68 close to an axial transmission side of the frictional connecting portion 49. The frictional connecting portion 68 has an annular flat pressing face 69 on an axial engine side. The pressing face 69 axially faces the second frictional member 46b.

An outer peripheral face 62 of the second piston 42 is in contact with and supported by the inner peripheral face 8c of the outer peripheral tubular portion 8. An annular groove is formed on the outer peripheral face 62 and a D ring 63 is disposed in the groove. The D ring 63 is in contact with the inner peripheral face 8c to seal axial opposite sides of the inner peripheral face 8c. On an axial transmission side of an outer peripheral portion of the second piston 42, an annular portion 64 further projecting toward an outer periphery side is formed. A spline 64a engaged with the spline 9 formed at the outer peripheral tubular portion 8 of the front cover 2 is formed on an outer peripheral face of the annular portion 64. By this spline engagement, the second piston 42 cannot rotate with respect to the front cover 2 but can move in the axial direction. A wire ring 65 is fixed to the axial transmission-side portion 8b of the outer peripheral tubular portion 8 and can come in contact with the annular portion 64 of the second piston 42. By this wire ring 65, movement of the second piston 42 toward the axial transmission side is restricted.

A tubular member 66 is fixed to an outer peripheral face of the tubular portion 50b of the drive member 50. An outer peripheral face of the tubular member 66 is in contact with an inner peripheral face of the second piston 42 and radially supports the second piston 42. The second piston 42 can move in the axial and rotating directions with respect to the tubular member 66. An annular groove is formed on the outer peripheral face of the tubular member 66 and a seal ring 67 is disposed in the groove. The seal ring 67 is in contact with the inner peripheral face of the second piston 42 and seals axial opposite sides of the inner peripheral face.

As a result of the above structure, a third space F is formed between the outer peripheral portion of the first piston 43 and the second piston 42 in the axial direction. An inner peripheral portion of the third space F is separated from other parts of the second space E by the above-described seal ring 67. An outer peripheral portion of the third space F is closed in a state in which the frictional connecting portion 49 and the frictional connecting portion 68 are in contact with each other and is open in a state in which the frictional connecting portions 49 and 68 are separated from each other. At least one hole 47 axially passing through the first piston 43 is formed at a radial inner portion of the frictional connecting portion 49 of the first piston 43. Through each hole 47, the first space D and the third space F communicate with each other.

Furthermore, on an outer periphery side of the frictional connecting portion 49 of the first piston 43, an annular fourth space G is obtained by the front cover 2 and the outer peripheral portion of the second piston 42. At least one hole 42a (connecting portions) axially passing through the second piston 42 is formed at the outer peripheral portion of the second piston 42. Through each hole 42a, the fourth space G communicates with the space (second space E) on the axial transmission side of the second piston 42. Each hole 42a is relatively small and arranged in a circumferential direction. Each hole 42a allows the hydraulic fluid to pass therethrough. Each hole 42a allows for the discharge of contamination and supply of the hydraulic fluid to the frictional face during slip control, which will be described later.

While summarizing the above description, a clutch-connecting portion 40 of the lockup device 4 will be described. The clutch connecting portion 40 is formed of the frictional face 70 of the front cover 2, the frictional connecting portion 49 of the first piston 43, and the pressing face 69 of the frictional connecting portion 68 of the second piston 42. Thus, the clutch-connecting portion 40 includes two frictional faces. Since the frictional connecting portion 49 and the frictional connecting portion 68 are the pistons which move respectively in the axial direction, a pressing force from the first piston 43 acts between the frictional face 70 and the frictional member 46, and a pressing force from the second piston 42 acts between the frictional member 46 and the pressing face 69.

The second piston 42 is disposed on the outer periphery side of the damper mechanism 44 as an input member for rotating with the front cover 2. Referring to FIG. 1, an inside diameter of the second piston 42 is larger than an outside diameter of the damper mechanism 44. Further, the second piston 42 is disposed at an outer periphery of the damper mechanism 44. Therefore, a space on one axial side of the damper mechanism 44 is not limited. As a result, it is possible to increase an axial dimension of the torsion spring 52 in the damper mechanism 44. Thus, designing the damper mechanism 44 becomes easy, and it is possible to improve a function of the torsion spring 52 such as a reduction in rigidity. Furthermore, since the second piston 42 is radially supported by a portion of the damper mechanism 44 and especially by the drive member 50, it is unnecessary to provide a special member or structure for supporting the second piston 42. Thus, the entire structure of the lockup device 4 is simplified.

Since the inner peripheral face of the first piston 43 is sealed with the seal ring 57 (see FIG. 1) and the inner peripheral face and the outer peripheral face of the second piston 42 are sealed with the seal ring 67 and the D ring 63 (see FIG. 2), the independent hydraulic chamber is formed on the axial engine side of the first piston 43 and the second piston 42. As seen in FIG. 2, this hydraulic chamber is mainly the space D according to the above description. The space F can also be regarded as a part of the hydraulic chamber. By controlling hydraulic pressure of this hydraulic chamber, it is possible to control engagement and disengagement of the lockup device 4.

(2) Dimensional Relationships

Next, dimensions of respective mechanisms of the torque converter 1 will be described. As seen in FIG. 1, a ratio (D2/D1) of an inside diameter D2 and an outside diameter D1 of the toric fluid actuating chamber B is equal to or greater than 0.61. Here, the inside diameter D2 is a diameter of a circle corresponding to an outer peripheral face of the carrier 27 of the stator 12. The outside diameter D1 is a diameter of a circle corresponding to an outermost peripheral portion of the impeller 10 or the turbine 11 (an outermost peripheral edge of each blade at the outlet of the impeller 10 or the inlet of the turbine 11). The above ratio indicates that the inside diameter D2 is much larger than that of the prior art provided the outside diameter D1 is substantially equal to that of the prior art. Therefore, space can be obtained on the inner periphery side of the fluid actuating chamber B and the torsion spring of the lockup device can be disposed in the space. D2/D1 is preferably in a range of 0.61 to 0.77. Since a flow path area in the torus becomes very small, if D2/D1 becomes equal to or greater than 0.77, flow rate acting on the blades decreases and a torque capacity of the impeller becomes small. Moreover, a radius of the outlet of the turbine becomes large and maximum efficiency of the torque converter is reduced.

A ratio (L/D1) of an axial dimension L of the fluid actuating chamber B to an outside diameter D1 of the torus is equal to or smaller than 0.122. This means that the axial dimension L is much smaller than that of the prior art provided the outside diameter D1 of the torus is substantially equal to that of the prior art.

Furthermore, a ratio of an axial dimension L of the torus to a radial dimension H of the torus is equal to or smaller than 0.65. The ratio L/H represents how round or flat the fluid-actuating chamber B is. Although the radial dimension H of the fluid actuating chamber B is much smaller than that of the prior art, the fluid actuating chamber B maintains a flatness. As a result, the axial dimension of the fluid actuating chamber B is about a half of that of the prior art.

Moreover, the turbine 11 has a smaller axial dimension than the impeller 10. In other words, the impeller 10 and the turbine 11 are preferably asymmetrical in the axial direction in the toric fluid actuating portion 3. A ratio (Lt/Lp) of an axial dimension Lt of the turbine 11 to an axial dimension Lp of the impeller 10 is preferably in a range of 0.8 to 0.95. The axial dimension Lt of the turbine 11 is an axial distance between the axial central position Cl and a portion inside the turbine shell 20, closest to the engine. The axial central position C1 is located between the outlet of the impeller 10 and the inlet of the turbine 11. The axial dimension Lp of the impeller 10 is an axial distance between the axial central position C1 and a portion inside the impeller shell 15, closest to the transmission.

The torsion spring 52 of the lockup device 4 is disposed on the inner periphery side of the fluid actuating chamber B. In other words, an outer periphery-side edge of the torsion spring 52 is positioned on the inner periphery side of an inner periphery-side edge (the outer peripheral face of the stator carrier 27) of the fluid actuating chamber B. A portion of the torsion spring 52 enters the inner periphery side of the fluid actuating chamber B. An edge of the torsion spring 52 on the axial transmission side is closer to the axial central position C1 of the torus than the edge of the turbine 11 on the axial transmission side.

As a result, a coil diameter of the torsion spring 52 is substantially increased compared with that of the prior art without increasing an axial dimension of the entire torque converter 1. In other words, the coil diameter Ld of the torsion spring 52 is smaller than the axial dimension L of the torus but larger than the axial dimension Lp of the impeller 10 and the axial dimension Lt of the turbine 11. Since a large coil diameter Ld of the torsion spring 52 can be obtained as described above, it is easy to improve performance of the torsion spring 52. As a result, it is possible to use fluid torque transmission by the torus of the torque converter 1 only at the start of the vehicle and then to use the torque converter 1 in a mechanical torque transmission state in which the lockup device 4 is connected.

If the size of the torus is reduced as described above, torque transmitting performance by fluid may be reduced. However, reduction of the torque transmitting performance does not become a significant problem in the torque converter in which torque transmission by fluid is conducted only at the start of the vehicle and the lockup device is connected at a speed of 20 km per hour or higher, for example. In the present embodiment, the axial dimension Lp of the impeller 10 is set to be longer than the axial dimension Lt of the turbine 11 to compensate for the above-described reduction of performance. Moreover, the axial dimension Ls of the stator 12 is set to be 6 mm or greater to compensate thereby for the performance reduction. Here, the axial dimension Ls of the stator 12 is a length of a portion where an axial width is the smallest.

(3) Operation

Next, the operation of the torque converter will be described. In a state in which connection of the clutch is cancelled, the hydraulic fluid is supplied from the third oil path to the inner peripheral side of the first space D. Referring to FIG. 2, the hydraulic fluid in the first space D flows radially outward, flows between the frictional face 70 and the first frictional member 46a, and flows from the fourth space G through each hole 42a to the outer peripheral side of the second space E. The hydraulic fluid in the second space E passes through a gap between the impeller shell 15 and the turbine shell 20 and flows from a gap between the outlet of the impeller 10 and the inlet of the turbine 11 into the fluid actuating chamber B shown in FIG. 1. The hydraulic fluid moving in the first space D passes through the holes 47 formed in the first piston 43 and flows into the third space F seen in FIG. 2. The hydraulic fluid in the third space F passes between the pressing face 69 and the second frictional member 46b and flows radially outward. This hydraulic fluid also flows to the outer peripheral side of the second space E through each hole 42a.

Since the hydraulic fluid in the fourth space G is discharged through each hole 42a in the above flow of the hydraulic fluid, contamination (sludge-like oxide of abrasive powder) generated on the frictional face and the like is sufficiently discharged and less liable to accumulate in the fourth space G. As a result, deterioration or the like of the D ring 63 due to the contamination is less likely to occur.

As seen in FIG. 1, since the first piston 43 and the second piston 42 respectively function as pistons for moving in the axial direction according to hydraulic pressure change in the space C, axial operations of both the members are stable. Therefore, the respective members are less likely to come in contact with each other in the clutch-connecting portion 40 shown in FIG. 2. In other words, drag torque is less liable to occur. In other words, movement of the second piston 42 toward the axial transmission side is restricted by the wire ring 65 and axial movement of the first piston 43 is restricted by the turbine hub 23 shown in FIG. 1. As a result, a predetermined clearance between the frictional face 70 and the first frictional member 46a and a predetermined clearance between the second frictional member 46b and the pressing face 69 are obtained as shown in FIG. 2.

Next, the clutch connecting operation will be described. The hydraulic fluid in the first space D is drained through the third oil path. Thus, the hydraulic fluid in the first space D flows toward the inner peripheral side and the hydraulic fluid in the third space F flows into the first space D through each hole 47. As a result, the first piston 43 moves toward the axial engine side due to a hydraulic pressure difference and the frictional connecting portion 49 comes in contact with the frictional face 70 of the front cover 2. Then, the second piston 42 also moves toward the axial engine side and the pressing face 69 comes in contact with the second frictional member 46b. At this time, because the first space D and the third space F communicate with each other through each hole 47, responsivity of the second piston 42 is enhanced.

Although the operation of the torque converter is classified into the torque transmission by fluid (a state in which the lockup device 4 is not connected) and the mechanical torque transmission (a state in which the lockup device 4 is connected) in the above description, it is also possible to control slip in which a ratio between the torque transmission by fluid and the mechanical transmission changes continuously.

The slip control will be described below. The damper mechanism of the lockup clutch absorbs torque change due to changes of combustion of the engine. However, since the torque change at such a low-speed region of the vehicle is not sufficiently absorbed by the damper mechanism, the lockup clutch cannot be used. Therefore, in order to further enhance fuel economy in the lower-speed region by using the lockup clutch, the slip control has been carried out in recent years. The slip control constantly applies predetermined slip rotation between the piston and the front cover by pushing the piston against the front cover with a small fastening force. If there is slip rotation, transmission of power is carried out by the mechanical transmission and the fluidal transmission. When the slip rotation is large, a proportion of mechanically transmitted power is small and a proportion of fluidally transmitted power is large. When the slip rotation is small, a proportion of the mechanically transmitted power is large and a proportion of the fluidally transmitted power is small. Control of the slip rotation is conducted by controlling a hydraulic pressure difference between opposite sides of the piston by a hydraulic controller in the torque converter.

A problem in the slip control is a large amount of work is done at the frictional face, because sliding occurs constantly at the frictional face. Therefore, it is desirable to provide a plurality of frictional faces to reduce an amount of work per unit area of the frictional face so as to control slip efficiently. It is also desirable to supply hydraulic fluid for cooling and lubrication to the frictional faces. To cool the former, the two pistons are used to obtain the plurality of frictional faces in the embodiment of the present invention. To lubricate, each hole 42a is formed at the outer periphery-side portion of the piston 42. By each hole 42a, the hydraulic fluid can flow between the frictional faces, i.e., between the frictional face 70 and the first frictional member 46a and between the pressing face 69 and the second frictional member 46b even during slip control.

A further problem caused by slip control is engine stall during sudden deceleration when the lockup device is connected and the vehicle is coasting. To solve this problem, the number of revolutions of the engine of the vehicle is detected and the lockup device is forcibly disconnected when the number reduces suddenly. In the preferred embodiment of the present invention, by sealing the outer peripheral side and the inner peripheral side of the second piston 42, the independent oil chamber for actuating the first piston 43 and the second piston 42 is obtained between the front cover 2 and the first piston 43. Since responsivity of the first piston 43 and the second piston 42 is improved in the above manner, it is possible to cancel swiftly the connection of the lockup device 4 in response to sudden braking. Especially by forming each hole 47 in the first piston 43, the responsivity of the second piston 42 is further improved.

In the torque converter according to the present invention, since the inside diameter of the fluid actuating portion is larger than that of the prior art, it is possible to dispose the torsion spring of the lockup device in the radially inner portion of the fluid actuating portion. Therefore, it is possible to increase sufficiently the size of the torsion spring to improve performance of the torsion spring without increasing the axial dimension of the torque converter.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A torque converter comprising:
    an impeller having at least one impeller blade, having an annular shape, and being configured to rotate about a rotational axis;
    a turbine having an annular shape, disposed axially adjacent said impeller, and being configured to rotate about said rotational axis; and
    a stator having an annular shape, and being configured to rotate about said rotational axis, said stator comprising
        a stator carrier extending toward said rotational axis away from said impeller and said turbine, and
        at least one stator blade disposed between said impeller and said turbine, said stator blade provided on an outer peripheral face of said stator carrier,
    said impeller, said turbine, and said stator forming a fluid-actuating portion having toric form around said rotational axis and having
        a first inside diameter extending from said outer peripheral face of said stator carrier through said rotational axis, and
        an outer diameter extending from an outermost peripheral edge of said impeller blade through said rotational axis,
    a ratio of said first inside diameter to said first outer diameter being equal to or greater than 0.61.
2. The torque converter according to claim 1, wherein said ratio is greater than or equal to 0.61 and less than 0.77.

3. The torque converter according to claim 1, further comprising a damper mechanism having at least one torsion spring disposed entirely within said first inside diameter.

4. The torque converter according to claim 1, wherein said torsion spring is configured to be compressed substantially in a circumferential direction along a circle having its center at said axis of rotation.

5. The torque converter according to claim 4, wherein said stator carrier has a recess extending axially toward said impeller and provided entirely within said first inside diameter.

6. The torque converter according to claim 1, further comprising,
- a front cover arranged axially opposite said impeller having said turbine disposed therebetween,
- a first piston disposed between said front cover and said turbine, and
- a second piston disposed between said first piston and said turbine.

7. The torque converter according to claim 6, wherein
said front cover has a first frictional face opposing said first piston,
said first piston has a second frictional face opposing said first frictional face, said first piston has a third frictional face opposing said second piston, and
said second piston has a fourth frictional face opposing said third frictional face.

8. The torque converter according to claim 7, wherein said second piston is non-rotatably and axially movably attached to said front cover.

9. The torque converter according to claim 8, wherein
said front cover has a toric shape with a second inside diameter parallel to said first inside diameter,
said first piston has a toric shape with a third inside diameter parallel to said first inside diameter, and
said second piston has a toric shape with a fourth inside diameter parallel to said first inside diameter,
such that each of said second inside diameter and said third inside diameter is smaller than said first inside diameter, and said fourth inside diameter is greater than said first inside diameter.

10. A torque converter comprising:
- a front cover having an annular shape and being configured to rotate about a rotational axis;
- a toric fluid-actuating portion having an impeller, a turbine, and a stator, said toric fluid-actuating portion having a center at said rotational axis; and
- a lockup device disposed between said front cover and said turbine to connect mechanically both said front cover and said turbine, said lockup device having,
- a torsion spring being configured to absorb and damp torsional vibration, an outer peripheral edge of said torsion spring being positioned on an inner periphery side of an inner peripheral edge of said fluid actuating portion.
- a first piston being disposed between said tone fluid-actuating portion and said front cover, said first piston being configured to abut said torsion spring.

11. The torque converter according to claim 10, wherein said lockup device further comprises,
- a second piston disposed between said toric fluid-actuating portion and said first piston.

12. The torque converter according to claim 11, wherein
said front cover has a first frictional face opposing said first piston,
said first piston has a second frictional face opposing said first frictional face, said first piston also has a third frictional face opposing said second piston, and
said second piston has a fourth frictional face opposing said third frictional face.

13. The torque converter according to claim 10, wherein said piston supports on axial side and rotational sides of said spring.

14. The torque converter according to claim 13, wherein said piston is configured to abut said front cover.

15. The torque convener according to claim 10, wherein said piston is configured to abut said front cover.

16. A torque converter comprising:
- a front cover being configured to rotate about a rotational axis, said front cover having a first frictional face;
- a toric fluid-actuating portion having an impeller, a turbine, and a stator, said toric fluid-actuating portion having a center at said rotational axis, said toric fluid-actuating portion having a first inside diameter extending from an inner peripheral edge of said fluid actuating portion through said axis of rotation, said front cover having a toric shape with a second inside diameter parallel to said first inside diameter; and
- a lockup device disposed between said front cover and said turbine to connect mechanically both said front cover and said turbine, said lockup device having,
- a torsion spring being configured to absorb and damp torsional vibration, an outer peripheral edge of said torsion spring being positioned on an inner periphery side of an inner peripheral edge of said fluid actuating portion,
- a first piston being opposed to said first frictional face, said first piston being disposed between said toric fluid-actuating portion and said front cover, said first piston having a second frictional face opposing said first frictional face, said first piston also having a third frictional face opposing said second piston, said first piston having a toric shape with a third inside diameter parallel to said first inside diameter, and
- a second piston being disposed between said toric fluid-actuating portion and said first piston, said second piston having a fourth frictional face opposing said third frictional face, said second piston having a toric shape with a fourth inside diameter parallel to said first inside diameter, each of said second inside diameter and said third inside diameter being smaller than said first inside diameter, and said fourth inside diameter being greater than said first inside diameter.

17. The torque converter according to claim 16, wherein said stator further comprises
- a stator carrier having an annular shape, said stator carrier disposed entirely within said first inside diameter, and
- at least one stator blade provided on an outer peripheral face of said stator carrier.

18. The torque converter according to claim 17, wherein said stator carrier has a first recess extending opposite said front cover.

19. The torque converter according to claim 18, wherein said first piston has at least one aperture to allow the flow of fluid.

20. The torque converter according to claim 19, wherein said second piston has at least one aperture to allow the flow of fluid.

21. The torque converter according to claim 18, wherein said first piston has a second recess opposing and corresponding to said first recess of said stator carrier.

22. The torque converter according to claim 21, wherein said torsion spring is disposed within said first recess and said second recess.

23. The torque converter according to claim 16, wherein said second piston is non-rotatably and axially movably attached to said front cover.

* * * * *